(12) United States Patent
Huang et al.

(10) Patent No.: US 12,473,583 B2
(45) Date of Patent: Nov. 18, 2025

(54) USE OF GUAR GUM, FLUORESCENCE-ENHANCED GOLD NANOCLUSTER, METHOD FOR DETECTING ALPHA-GLUCOSIDASE, AND METHOD FOR SCREENING ALPHA-GLUCOSIDASE INHIBITOR

(71) Applicant: Jilin University, Changchun (CN)

(72) Inventors: Zhenzhen Huang, Changchun (CN); Xiaoyu Geng, Changchun (CN); Ruisong Xue, Changchun (CN); Shiyong Teng, Changchun (CN); Jinshuo Li, Changchun (CN); Yanmei Liu, Changchun (CN); Wensheng Yang, Changchun (CN)

(73) Assignee: Jilin University, Changchun (CN)

( * ) Notice: Subject to any disclaimer, the term of this patent is extended or adjusted under 35 U.S.C. 154(b) by 495 days.

(21) Appl. No.: 17/820,891

(22) Filed: Aug. 19, 2022

(65) Prior Publication Data
US 2023/0399675 A1    Dec. 14, 2023

(30) Foreign Application Priority Data
Jun. 10, 2022 (CN) .......................... 202210655257.5

(51) Int. Cl.
*C12Q 1/40* (2006.01)
*G01N 21/64* (2006.01)

(52) U.S. Cl.
CPC .......... *C12Q 1/40* (2013.01); *C12Y 302/0102* (2013.01); *G01N 21/6428* (2013.01); *G01N 2021/6439* (2013.01)

(58) Field of Classification Search
CPC .......................... C12Q 1/40; C12Y 302/0102; G01N 21/6428; G01N 2021/6439; G01N 21/648; G01N 33/542; G01N 33/582; G01N 33/573; G01N 2021/6432
See application file for complete search history.

(56) References Cited

PUBLICATIONS

Shi M, Cen Y, Xu G, Wei F, Xu X, Cheng X, Chai Y, Sohail M, Hu Q. Ratiometric fluorescence monitoring of Î±-glucosidase activity based on oxidase-like property of MnO2 nanosheet and its application for inhibitor screening. Analytica Chimica Acta. Oct. 24, 2019; 1077:225-31. (Year: 2019).*

Dong W, Yu J, Gong X, Liang W, Fan L, Dong C. A turn-off-on near-infrared photoluminescence sensor for sequential detection of Fe3+ and ascorbic acid based on glutathione-capped gold nanoclusters. Spectrochimica Acta Part A: Molecular and Biomolecular Spectroscopy. Feb. 15, 2021;247:119085. (Year: 2021).*

Pandey S, Goswami GK, Nanda KK. Green synthesis of polysaccharide/gold nanoparticle nanocomposite: an efficient ammonia sensor. Carbohydrate polymers. Apr. 15, 2013;94(1):229-34. (Year: 2013).*

Li Z, Peng H, Liu J, Tian Y, Yang W, Yao J, Shao Z, Chen X. Plant protein-directed synthesis of luminescent gold nanocluster hybrids for tumor imaging. ACS applied materials & interfaces. Jan. 10, 2018;10(1):83-90. (Year: 2018).*

Li G, et al. A fluorescence resonance energy transfer (FRET) based "Turn-On" nanofluorescence sensor using a nitrogen-doped carbon dot-hexagonal cobalt oxyhydroxide nanosheet architecture and application to α-glucosidase inhibitor screening. Biosensors and Bioelectronics. May 15, 2016;79:728-35. (Year: 2016).*

* cited by examiner

*Primary Examiner* — Jennifer M. H. Tichy
*Assistant Examiner* — Emily F Eix
(74) *Attorney, Agent, or Firm* — Shih IP Law Group, PLLC

(57) ABSTRACT

The present disclosure provides use of guar gum, a fluorescence-enhanced gold nanocluster, a method for detecting α-glucosidase (α-Glu), and a method for screening an α-Glu inhibitor, and belongs to the technical field of nanoscale biosensing. The present disclosure provides the use of the guar gum in improving a fluorescence emission intensity of a gold nanocluster. In the present disclosure, the guar gum is a natural high-molecular polymer extracted from seeds of guar, a leguminous plant, and has a low price, no toxicity, and desirable biocompatibility. The guar gum includes galactose and mannose, is rich in hydroxyl groups in a molecular backbone, and can improve a fluorescence emission intensity of the gold nanocluster. On this basis, detection of an α-Glu activity and screening of an α-Glu inhibitor can be realized with a high sensitivity and low cost.

8 Claims, 12 Drawing Sheets

USE OF GUAR GUM, FLUORESCENCE-ENHANCED GOLD NANOCLUSTER, METHOD FOR DETECTING ALPHA-GLUCOSIDASE, AND METHOD FOR SCREENING ALPHA-GLUCOSIDASE INHIBITOR

CROSS REFERENCE TO RELATED APPLICATION

This patent application claims the benefit and priority of Chinese Patent Application No. 202210655257.5, filed on Jun. 10, 2022, the disclosure of which is incorporated by reference herein in its entirety as part of the present application.

TECHNICAL FIELD

The present disclosure relates to the technical field of nanoscale biosensing, in particular to use of guar gum, a fluorescence-enhanced gold nanocluster, a method for detecting α-glucosidase (α-Glu), and a method for screening an α-Glu inhibitor.

BACKGROUND ART

Diabetes is a metabolic disease characterized by high blood sugar that causes persistent damages to eyes, kidneys, heart, and blood vessels. Diabetes includes type I diabetes, type II diabetes, and gestational diabetes. Type II diabetes is associated with insufficient insulin secretion or insulin resistance, accounting for not less than 90% of current diabetes patients and affecting approximately 463 million people worldwide. α-Glu is a carbohydrate hydrolase that promotes the conversion of oligosaccharides and disaccharides into glucose in the small intestine, and excess α-Glu can lead to hyperglycemia. In recent years, studies have found that α-Glu inhibitors can effectively reduce the activity of α-Glu, thereby effectively inhibiting the increase of blood sugar level. At present, the α-Glu has become an important enzyme target for the prevention and treatment of type II diabetes; and α-Glu inhibitors such as acarbose have become the few oral drugs available for treating the type II diabetes. Therefore, the detection of α-Glu activity and the screening of α-Glu inhibitors, especially the screening of α-Glu inhibitors with low cost and less side effects from natural products, are of great significance for the prevention and treatment of type II diabetes.

The p-nitrophenol glucopyranoside colorimetric method, as a classical method for α-Glu activity detection and α-Glu inhibitor screening, has a low sensitivity and large interference. Novel α-Glu activity assay methods include high-performance liquid chromatography, surface plasmon resonance, electrochemical method, and fluorescence method. Among them, the fluorescence method based on nanoprobes (such as semiconductor quantum dots, carbon quantum dots, and copper nanoclusters) has attracted much attention due to a high sensitivity and rapid detection. However, the fluorescence method generally has complex preparation of fluorescent probes, narrow measurement range, poor stability, easy oxidation, and easy interference. Therefore, it remains a great challenge to develop more efficient methods for α-Glu fluorescence detection and α-Glu inhibitor screening.

Gold nanocluster, as a novel fluorescent nanomaterial, is generally less than 3 nm in size, and composed of several to hundreds of gold atoms (or gold ions) and protective ligands. Gold nanoclusters, due to a simple preparation, desirable biocompatibility, high stability, and excellent water solubility, have broad prospects for use in the fields of fluorescence sensing, bioimaging, drug delivery, and disease treatment. However, compared with classical fluorescent dyes and semiconductor quantum dots, the fluorescence quantum yield and fluorescence emission intensity of gold nanoclusters are generally low, limiting a range of application for the gold nanoclusters. Currently, the fluorescence properties of gold nanoclusters have been improved by methods such as metal doping, aggregation-induced emission, and matrix encapsulation. However, these methods generally pollute the environment due to requirement of a large amount of organic solvents and heavy metal ions.

SUMMARY OF THE INVENTION

An objective of the present disclosure is to provide use of guar gum, a fluorescence-enhanced gold nanocluster, a method for detecting α-Glu, and a method for screening an α-Glu inhibitor. In the present disclosure, the guar gum can improve a fluorescence emission intensity of the gold nanocluster; and on this basis, detection of an α-Glu activity and screening of the α-Glu inhibitor can be achieved with a high sensitivity and low cost, which is environmental-friendly.

To achieve the above objective, the present disclosure provides the following technical solutions.

The present disclosure provides of guar gum in improving a fluorescence emission intensity of a gold nanocluster.

Preferably, the gold nanocluster may have a protective ligand of glutathione.

The present disclosure further provides a fluorescence-enhanced gold nanocluster, prepared by the following raw materials: a gold nanocluster, guar gum, and water.

The present disclosure further provides a method for detecting an α-Glu activity, including the following steps:
providing a fluorescence-enhanced gold nanocluster-$Fe^{3+}$ mixed dispersion, where a fluorescence-enhanced gold nanocluster in the fluorescence-enhanced gold nanocluster-$Fe^{3+}$ mixed dispersion is the fluorescence-enhanced gold nanocluster in the above technical solution;
mixing an α-Glu solution to be tested, an L-ascorbic acid-2-O-α-D-glucopyranoside (AAG) solution, and a phosphate-buffered saline (PBS), and conducting first incubation to obtain a first incubation solution;
mixing the first incubation solution with the fluorescence-enhanced gold nanocluster-$Fe^{3+}$ mixed dispersion, and conducting second incubation to obtain a second incubation solution; and
subjecting the second incubation solution to fluorescence detection, and obtaining an activity of the α-Glu to be tested according to a working curve of the α-Glu activity and a fluorescence emission intensity obtained by the fluorescence detection.

Preferably, the fluorescence-enhanced gold nanocluster-$Fe^{3+}$ mixed dispersion may have a pH value of 4.0 to 9.0, and may include 10 μg/mL to 90 μg/mL of the gold nanocluster, 0.05 wt. % to 1.0 wt. % of the guar gum, and 0.1 μmol/L to 100 μmol/L of $Fe^{3+}$.

Preferably, the first incubation may be conducted at 30° C. to 50° C. and a pH value of 6.0 to 8.0 for 40 min to 60 min, with 1 mmol/L to 20 mmol/L of AAG.

Preferably, the second incubation may be conducted at 20° C. to 30° C. for 10 min to 60 min; and the first incubation solution and the fluorescence-enhanced gold nanocluster-$Fe^{3+}$ mixed dispersion may have a volume ratio of 1:(1-10).

Preferably, the fluorescence detection may be conducted at a wavelength of 610 nm.

The present disclosure further provides a method for screening an α-Glu inhibitor, including the following steps:

providing a fluorescence-enhanced gold nanocluster-$Fe^{3+}$ mixed dispersion, where a fluorescence-enhanced gold nanocluster in the fluorescence-enhanced gold nanocluster-$Fe^{3+}$ mixed dispersion is the fluorescence-enhanced gold nanocluster in the above technical solution;

mixing an α-Glu inhibitor solution to be tested, an α-Glu solution, an AAG solution, and a PBS, and conducting third incubation to obtain a third incubation solution;

mixing the third incubation solution with the fluorescence-enhanced gold nanocluster-$Fe^{3+}$ mixed dispersion, and conducting fourth incubation to obtain a fourth incubation solution; and subjecting the fourth incubation solution to fluorescence detection, and plotting a calibration curve of the α-Glu inhibitor to be tested according to a fluorescence emission intensity obtained by the fluorescence detection; according to the calibration curve of the α-Glu inhibitor to be tested, obtaining a half-maximal inhibitory concentration ($IC_{50}$) of the α-Glu inhibitor to be tested to screening the α-Glu inhibitor.

Preferably, the α-Glu inhibitor to be tested may be selected from the group consisting of acarbose and a plant extract-derived α-Glu inhibitor.

The present disclosure provides of guar gum in improving a fluorescence emission intensity of a gold nanocluster. In the present disclosure, the guar gum is a natural high-molecular polymer extracted from seeds of guar, a leguminous plant, and has a low price, no toxicity, and desirable biocompatibility. The guar gum includes galactose and mannose, is rich in hydroxyl groups in a molecular backbone, and can improve a fluorescence emission intensity of the gold nanocluster. On this basis, detection of an α-Glu activity and screening of an α-Glu inhibitor can be realized with a high sensitivity and low cost. Moreover, the method is environmental-friendly and simple to operate, and avoids modification of fluorescent probes and use of a large number of organic reagents. Therefore, the present disclosure has broad prospects for use in prevention and treatment of diabetes.

DETAILED DESCRIPTION OF THE EMBODIMENTS

Figure 1:
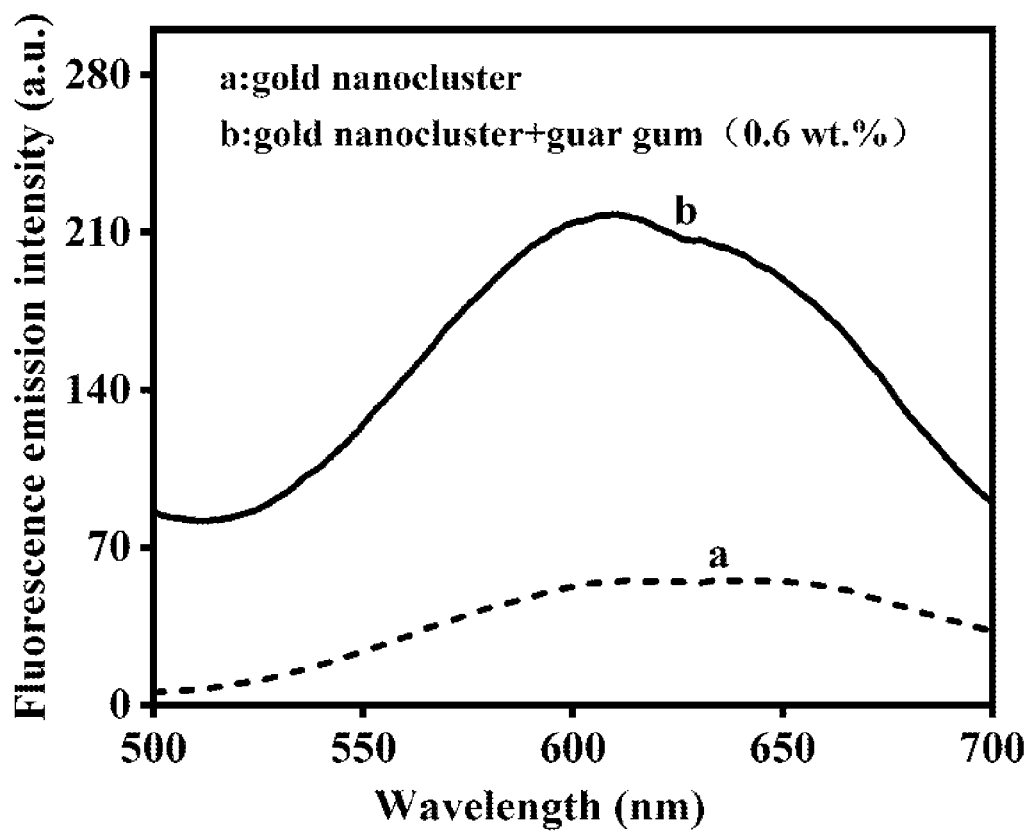
FIG. 1 shows fluorescence spectra of a gold nanocluster dispersion and a guar gum-gold nanocluster mixed dispersion (the guar gum dispersion has a pH value of 8.0 and a concentration of 0.6 wt. %) in Example 2.

The present disclosure provides of guar gum in improving a fluorescence emission intensity of a gold nanocluster.

In the present disclosure, unless otherwise specified, the raw materials used are all commercially-available commodities well known to those skilled in the art or prepared by methods well known to those skilled in the art.

In the present disclosure, the gold nanocluster has a protective ligand of preferably glutathione. The gold nanocluster and guar gum have a mass ratio of preferably 1:(2-60), more preferably 1:(5-30), further preferably 1:10. The guar gum can improve a fluorescence emission intensity of the gold nanocluster; specifically, the guar gum is added to a water dispersion system containing the gold nanocluster to improve the fluorescence emission intensity of gold nanocluster. Guar gum is a natural high-molecular polymer extracted from seeds of a leguminous plant, guar, which has a low price, no toxicity and desirable biocompatibility. Guar gum mainly includes galactose and mannose, and a molecular backbone thereof is rich in a large number of hydroxyl groups, which can easily form hydrogen bonds in water, thereby effectively changing the properties of a water dispersion system. Specifically, in the gold nanocluster, a radiative transition rate can be increased and a non-radiative transition rate can be reduced by prolonging a solvent redirection time and inhibiting intramolecular vibration and rotation of the protective ligand of the gold nanocluster, thereby effectively improving a fluorescence emission intensity of the gold nanocluster.

In the present disclosure, the guar gum dispersion is mixed preferably with the gold nanocluster dispersion, to increase a fluorescence emission intensity of the gold nanocluster through the guar gum.

In the present disclosure, the guar gum dispersion has preferably 0.05 wt. % to 1.0 wt. %, specifically 0.1 wt. %, 0.2 wt. %, 0.3 wt. %, 0.4 wt. %. %, 0.5 wt. %, 0.6 wt. %, 0.7 wt. %, 0.8 wt. %, 0.9 wt. %, or 1.0 wt. % of the guar gum by concentration; a solvent of the guar gum dispersion includes preferably water, more preferably a Tris buffer solution in order to facilitate adjusting a pH value; and the Tris buffer solution has a concentration of preferably 10 mmol/L, and a pH value of preferably 4.0 to 9.0, specifically 4.0, 5.0, 6.0, 7.0, 8.0, or 9.0. Preferably, the guar gum is mixed with the Tris buffer solution at room temperature (25° C.), and stirred evenly to obtain the guar gum dispersion.

In the present disclosure, the gold nanocluster dispersion has preferably 0.1 mg/mL to 1 mg/mL, more preferably 0.6 mg/mL of the gold nanocluster by concentration; and a solvent of the gold nanocluster dispersion is preferably water. A preparation method of the gold nanocluster dispersion includes preferably the following steps: mixing a tetrachloroauric acid aqueous solution and a protective ligand aqueous solution with water, and conducting a reaction under stirring to obtain the gold nanocluster dispersion. The tetrachloroauric acid aqueous solution is preferably a newly-prepared tetrachloroauric acid aqueous solution, with a concentration of preferably 20 μmol/L; the protective ligand aqueous solution preferably has a concentration of 100 μmol/L; the tetrachloroauric acid aqueous solution, the protective ligand aqueous solution, and water have a volume ratio of preferably 0.5:0.15:4.35; the water is preferably ultrapure water; and the tetrachloroauric acid aqueous solution, the protective ligand aqueous solution, and the water are preferably mixed at room temperature. The reaction is conducted at preferably 70° C. for preferably 12 h; and the stirring is conducted at preferably 500 rpm. During the reaction, the reaction system is gradually changed from pale yellow to bright yellow. When being is used as a protective ligand, the glutathione also acts as a reducing agent, eliminating the need of expensive protein protective ligands and external reducing agents.

In the present disclosure, the guar gum dispersion is mixed preferably with the gold nanocluster dispersion to obtain a guar gum-gold nanocluster mixed dispersion. After mixing the guar gum dispersion with the gold nanocluster dispersion, an obtained system is preferably allowed to stand to fully mix each component, to obtain a uniform and stable guar gum-gold nanocluster mixed dispersion. The standing is conducted preferably at room temperature for preferably 10 min.

In the present disclosure, fluorescence detection is conducted on the guar gum-gold nanocluster mixed dispersion. The fluorescence detection is conducted preferably at a wavelength of 610 nm. A fluorescence emission intensity of the gold nanocluster can be significantly enhanced by the guar gum; in an example, taking a guar gum-gold nanocluster mixed dispersion obtained by mixing 50 μL of the gold nanocluster dispersion (concentration of 0.6 mg/mL) with 500 μL of the guar gum dispersion as an example: when the guar gum dispersion has a concentration of 0.6 wt. % and a pH of 8.0, the gold nanocluster has a nearly 4-fold increase in the fluorescence emission intensity, and a fluorescence quantum yield increased from 0.96% to 2%.

The present disclosure further provides a fluorescence-enhanced gold nanocluster, prepared by the following raw materials: a gold nanocluster, guar gum, and water; to facilitate pH adjustment, the raw materials include preferably the gold nanocluster, the guar gum, and a Tris buffer solution. The fluorescence-enhanced gold nanocluster is preferably the guar gum-gold nanocluster mixed dispersion in the above technical solution, which will not be repeated here.

The present disclosure further provides a method for detecting an α-Glu activity, including the following steps:
  providing a fluorescence-enhanced gold nanocluster-$Fe^{3+}$ mixed dispersion, where a fluorescence-enhanced gold nanocluster in the fluorescence-enhanced gold nanocluster-$Fe^{3+}$ mixed dispersion is the fluorescence-enhanced gold nanocluster in the above technical solution;
  mixing an α-Glu solution to be tested, an AAG solution, and a phosphate-buffered saline (PBS), and conducting first incubation to obtain a first incubation solution;
  mixing the first incubation solution with the fluorescence-enhanced gold nanocluster-$Fe^{3+}$ mixed dispersion, and conducting second incubation to obtain a second incubation solution; and
  subjecting the second incubation solution to fluorescence detection, and obtaining an activity of the α-Glu to be tested according to a working curve of the α-Glu activity and a fluorescence emission intensity obtained by the fluorescence detection.

The present disclosure provides a fluorescence-enhanced gold nanocluster-$Fe^{3+}$ mixed dispersion. In the present disclosure, in the fluorescence-enhanced gold nanocluster-$Fe^{3+}$ mixed dispersion: the gold nanocluster has a concentration of preferably 10 μg/mL to 90 μg/mL, more preferably 40 μg/mL to 60 μg/mL, and further more preferably 54 μg/mL; the guar gum has a concentration of preferably 0.05 wt. % to 1.0 wt. %, more preferably 0.2 wt. % to 0.6 wt. %; $Fe^{3+}$ has a concentration of preferably 0.1 μmol/L to 100 μmol/L, more preferably 0.36 μmol/L to 90 μmol/L, further more preferably 18 μmol/L; and the fluorescence-enhanced gold nanocluster-$Fe^{3+}$ mixed dispersion has a pH value of preferably 4.0 to 9.0, more preferably 6.0 to 8.0. Preferably, the guar gum dispersion, the gold nanocluster dispersion and the $Fe^{3+}$ solution are mixed to obtain the fluorescence-enhanced gold nanocluster-$Fe^{3+}$ mixed dispersion. The guar gum dispersion and the gold nanocluster dispersion are preferably the guar gum dispersion and the gold nanocluster dispersion in the above technical solution, which will not be repeated here. In the $Fe^{3+}$ solution, $Fe^{3+}$ has a concentration of preferably 0.1 mmol/L to 10 mmol/L, more preferably 0.5 mmol/L to 1 mmol/L; the $Fe^{3+}$ solution has a solute of preferably $FeCl_3 \cdot H_2O$ and a solvent of preferably hydrochloric acid, and the hydrochloric acid has a concentration of preferably 0.1 mol/L to 1 mol/L, more preferably 0.1 mol/L to 0.5 mol/L; the hydrochloric acid is preferably used as the solvent to inhibit hydrolysis of $Fe^{3+}$ in the aqueous solution. In an example, specifically, 50 μL of the gold nanocluster dispersion (concentration of 0.6 mg/mL) was mixed with 500 μL of the guar gum dispersion (pH=8.0, concentration of 0.6 wt. %), allowed to stand at room temperature for 10 min, 10 μL of the $Fe^{3+}$ solution with a concentration of 1 mmol/L (the solute is $FeCl_3 \cdot H_2O$, the solvent is hydrochloric acid with a concentration of 0.1 mol/L) is added, and incubation is conducted for 10 min at room temperature to obtain the fluorescence-enhanced gold nanocluster-$Fe^{3+}$ mixed dispersion. The $Fe^{3+}$ quenches the fluorescence of gold nanocluster.

In the present disclosure, the α-Glu solution to be tested, the AAG solution, and the PBS are mixed, and the first incubation is conducted to obtain the first incubation solution. The first incubation is conducted at a pH value of preferably 6.0 to 8.0, more preferably 7.0; the AAG has a concentration of preferably 1 mmol/L to 20 mmol/L, more preferably 2 mmol/L to 7 mmol/L, further preferably 3 mmol/L to 5 mmol/L. The PBS has a concentration of preferably 0.05 mol/L to 0.2 mol/L, more preferably 0.1 mol/L, and a pH value of preferably 7.0. In an example, 100 μL of the α-Glu solution to be tested, 150 μL of the AAG solution (concentration of 10 mmol/L) and 200 μL of the PBS (concentration of 0.1 mol/L, pH=7.0) are mixed to conduct the first incubation. The first incubation is conducted at preferably 30° C. to 50° C., more preferably 37° C. for preferably 40 min to 60 min, more preferably 40 min to 50 min by preferably standing. During the first incubation, the AAG produces ascorbic acid under catalysis of the α-Glu.

In the present disclosure, the first incubation solution is mixed with the fluorescence-enhanced gold nanocluster-$Fe^{3+}$ mixed dispersion, and the second incubation is conducted to obtain the second incubation solution (namely the guar gum-gold nanocluster-$Fe^{3+}$-α-Glu mixed dispersion). The first incubation solution and the fluorescence-enhanced gold nanocluster-$Fe^{3+}$ mixed dispersion have a volume ratio of preferably 1:(1-10), more preferably 1:(1-3), and further more preferably 1:(1.2-1.5). The second incubation is conducted at preferably 20° C. to 30° C., more preferably room temperature for preferably 10 min to 60 min, more preferably 10 min to 20 min. The ascorbic acid can effectively restore the fluorescence of gold nanocluster quenched by $Fe^{3+}$.

In the present disclosure, the second incubation solution is subjected to fluorescence detection, and the activity of the α-Glu to be tested is obtained according to the working curve of the α-Glu activity and the fluorescence emission intensity obtained by the fluorescence detection. The fluorescence detection is conducted preferably at a wavelength of 610 nm. $Fe^{3+}$ can quench the fluorescence of gold nanocluster through dynamic quenching; in the presence of α-Glu and its substrate AAG, the α-Glu catalyzes the hydrolysis of AAG to generate ascorbic acid, thereby partially restoring the fluorescence emission of gold nanocluster quenched by $Fe^{3+}$; therefore, the α-Glu activity can be detected based on fluorescence methods. The working curve of the α-Glu activity is specifically a linear curve of a fluorescence emission intensity ratio ($I/I_0$) to the α-Glu activity (log $C_{\alpha\text{-}Glu}$); where I is a fluorescence emission intensity of the second incubation solution (that is, a fluorescence emission intensity of the first incubation solution mixed with the fluorescence-enhanced gold nanocluster-$Fe^{3+}$ mixed dispersion after the second incubation), and $I_0$ is a fluorescence emission intensity of a blank dispersion. Specifically, the blank dispersion is prepared by replacing the α-Glu solution to be tested and the AAG solution with an equal volume of water, followed by the first incubation and the second incubation in sequence according to the above method. According to the fluorescence emission intensity of the second incubation solution, the fluorescence emission intensity ratio ($I/I_0$) can be obtained, and then the activity of the α-Glu to be tested can be obtained. The method for detecting an α-Glu activity has a higher detection range of 2 U/L to 4,000 U/L and a lower detection limit of 0.13 U/L. Moreover, the method avoids modification of fluorescent probes and use of a large number of organic reagents.

The present disclosure further provides a method for screening an α-Glu inhibitor, including the following steps:
  providing a fluorescence-enhanced gold nanocluster-$Fe^{3+}$ mixed dispersion, where a fluorescence-enhanced gold nanocluster in the fluorescence-enhanced gold nanocluster-$Fe^{3+}$ mixed dispersion is the fluorescence-enhanced gold nanocluster in the above technical solution;
  mixing an α-Glu inhibitor solution to be tested, an α-Glu solution, an AAG solution, and a PBS, and conducting third incubation to obtain a third incubation solution;
  mixing the third incubation solution with the fluorescence-enhanced gold nanocluster-$Fe^{3+}$ mixed dispersion, and conducting fourth incubation to obtain a fourth incubation solution; and
  subjecting the fourth incubation solution to fluorescence detection, and plotting a calibration curve of the α-Glu inhibitor to be tested according to a fluorescence emission intensity obtained by the fluorescence detection;
  according to the calibration curve of the α-Glu inhibitor to be tested, obtaining an $IC_{50}$ of the α-Glu inhibitor to be tested to screen the α-Glu inhibitor.

The present disclosure provides a fluorescence-enhanced gold nanocluster-$Fe^{3+}$ mixed dispersion, where the fluorescence-enhanced gold nanocluster-$Fe^{3+}$ mixed dispersion is preferably the fluorescence-enhanced gold nanocluster-$Fe^{3+}$ mixed dispersion in the above technical solution, which will not be repeated here.

In the present disclosure, the α-Glu inhibitor solution to be tested, the α-Glu solution, the AAG solution, and the PBS are mixed, and the third incubation is conducted to obtain the third incubation solution. The third incubation is conducted at a pH value of preferably 6.0 to 8.0, more preferably 7.0; the α-Glu has a concentration of preferably 1 U/mL to 10 U/mL, more preferably 2 U/mL to 4 U/mL; the AAG has a concentration of preferably 1 mmol/L to 20 mmol/L, more preferably 2 mmol/L to 7 mmol/L, and further more preferably 3 mmol/L to 5 mmol/L. The PBS has a concentration of preferably 0.05 mol/L to 0.2 mol/L, more preferably 0.1 mol/L, and a pH value of preferably 7.0. In an example, specifically, 20 µL of the α-Glu inhibitor solution to be tested, 100 µL of the α-Glu solution (concentration of 10 U/mL), 150 µL of the AAG solution (concentration of 10 mmol/L) and 200 µL of the PBS (concentration of 0.1 mol/L, pH=7.0) are mixed to conduct the third incubation. The third incubation is conducted by preferably the same as those of the first incubation, which will not be repeated here.

In the present disclosure, the third incubation solution is mixed with the fluorescence-enhanced gold nanocluster-$Fe^{3+}$ mixed dispersion, and the fourth incubation is conducted to obtain the fourth incubation solution. The third incubation solution and the fluorescence-enhanced gold nanocluster-$Fe^{3+}$ mixed dispersion have a volume ratio of preferably 1:(1-10), more preferably 1:(1-3), and further more preferably 1:(1-1.2). The fourth incubation is conducted by preferably the same as those of the second incubation, which will not be repeated here.

In the present disclosure, the fourth incubation solution is subjected to fluorescence detection, and the calibration curve of the α-Glu inhibitor to be tested is plotted according to the fluorescence emission intensity obtained by the fluorescence detection; according to the calibration curve of the α-Glu inhibitor to be tested, the $IC_{50}$ of the α-Glu inhibitor to be tested is obtained to screen the α-Glu inhibitor. The fluorescence detection is conducted preferably at a wavelength of 610 nm. The calibration curve of the α-Glu inhibitor to be tested is preferably a linear curve of an inhibitory efficiency (%) of the α-Glu inhibitor to be tested and a concentration of the α-Glu inhibitor to be tested. According to the fluorescence emission intensity of the fourth incubation solution, the activity of α-Glu can be determined, and then the inhibitory efficiency of the α-Glu inhibitor to be tested can be obtained; preferably, the calibration curve of the α-Glu inhibitor to be tested is plotted with the concentration of the α-Glu inhibitor to be tested as an abscissa and the corresponding inhibitory efficiency as an ordinate; a concentration of the α-Glu inhibitor to be tested corresponding to inhibition of 50% α-Glu activity is read from the calibration curve of the α-Glu inhibitor to be tested, namely $IC_{50}$; on this basis, the α-Glu inhibitors can be screened. The inhibitory efficiency of the α-Glu inhibitor to be tested is preferably calculated with reference to formula A:

$$\text{Inhibitory efficiency} = [I_{AuNCs+\alpha\text{-}Glu} - I_{AuNCs+\alpha\text{-}Glu+\alpha\text{-}Glu\ inhibitor\ to\ be\ tested}]/[I_{AuNCs+\alpha\text{-}Glu} - I_{AuNCs}],  \quad \text{Formula A;}$$

where $I_{AuNCs+\alpha-Glu}$ represents a fluorescence emission intensity of the guar gum-gold nanoclusters-$Fe^{3+}$-α-Glu mixed dispersion;

$I_{AuNCs+\alpha-Glu+\alpha-Glu\ inhibitor\ to\ be\ tested}$ represents a fluorescence emission intensity of the fourth incubation solution; and $I_{AuNCs}$ represents a fluorescence emission intensity of the fluorescence-enhanced gold nanocluster-$Fe^{3+}$ mixed dispersion.

In the present disclosure, the method is suitable for screening various α-Glu inhibitors; the α-Glu inhibitor is preferably selected from the group consisting of acarbose or a plant extract-derived α-Glu inhibitor; and the plant extract-derived α-Glu inhibitor is preferably selected from the group consisting of quercetin, rutin, hesperidin, baicalin, and theaflavin.

The technical solutions in the present disclosure are clearly and completely described below in conjunction with examples of the present disclosure. It is clear that the described examples are merely a part, rather than all of the examples of the present disclosure. All other examples obtained by a person of ordinary skill in the art based on the examples of the present disclosure without creative efforts shall fall within the protection scope of the present disclosure.

Example 1 Preparation of Gold Nanocluster Dispersion and Guar Gum Dispersion

A preparation method of a gold nanocluster dispersion included the following steps:

0.50 mL of a freshly prepared 20 μmol/L tetrachloroauric acid aqueous solution, 0.15 mL of a freshly prepared 100 μmol/L glutathione (GSH) aqueous solution, and 4.35 mL of ultrapure water were mixed at room temperature (25° C.); under a stirring speed of 500 rpm, an obtained mixture was heated to 70° C. to conduct a reaction for 12 h, and the reaction system gradually changed from pale yellow to bright yellow to obtain a gold nanocluster dispersion; where in the gold nanocluster dispersion, gold nanoclusters (GSH-AuNCs) used glutathione as a protective ligand, and had a concentration of 0.6 mg/mL.

A preparation method of guar gum dispersions with different concentrations and pH values included the following steps:

0, 100 mg, 200 mg, 300 mg, 400 mg, 500 mg, 600 mg, 700 mg, 800 mg, 900 mg, and 1000 mg of guar gum (GG, purchased from Shanghai Aladdin Biochemical Technology Co., Ltd.) powders were mixed with 100 mL of a Tris buffer solution with a concentration of 10 mmol/L and a pH value of 8.0 at room temperature, and stirred evenly to obtain guar gum dispersions with a pH value of 8.0 and a guar gum concentration of 0, 0.1 wt. %, 0.2 wt. %, 0.3 wt. %, 0.4 wt. %, 0.5 wt. %, 0.6 wt. %, 0.7 wt. %, 0.8 wt. %, 0.9 wt. %, and 1.0 wt. %, respectively.

6 parts of a 600 mg guar gum powder were mixed with 100 mL of Tris buffer solutions with a concentration of 50 mmol/L and pH values of 4.0, 5.0, 6.0, 7.0, 8.0, and 9.0 at room temperature, and stirred well to obtain guar gum dispersions with a guar gum concentration of 0.6 wt. % and pH values of 4.0, 5.0, 6.0, 7.0, 8.0, and 9.0, respectively.

The gold nanocluster dispersion and the guar gum dispersion used in the following examples were all from this example, and no special description was given in the following.

Example 2 Preparation of Fluorescence-Enhanced Gold Nanocluster Dispersion

50 μL of the gold nanocluster dispersion was mixed with 500 μL of the guar gum dispersions with different concentrations or pH values, and allowed to stand for 10 min at room temperature; a fluorescence spectrum of an obtained guar gum-gold nanocluster mixed dispersion was measured, and a fluorescence emission intensity at 610 nm was recorded and compared with a fluorescence emission intensity of the gold nanocluster dispersion.

FIG. 1 shows fluorescence spectra of the gold nanocluster dispersion and the guar gum-gold nanocluster mixed dispersion (the guar gum dispersion has a pH value of 8.0 and a concentration of 0.6 wt. %); where a is the fluorescence emission spectrum of the gold nanocluster dispersion, and b is the fluorescence emission spectrum of the guar gum-gold nanocluster mixed dispersion. The results show that the guar gum can significantly enhance the fluorescence emission intensity of gold nanocluster.

Figure 2:
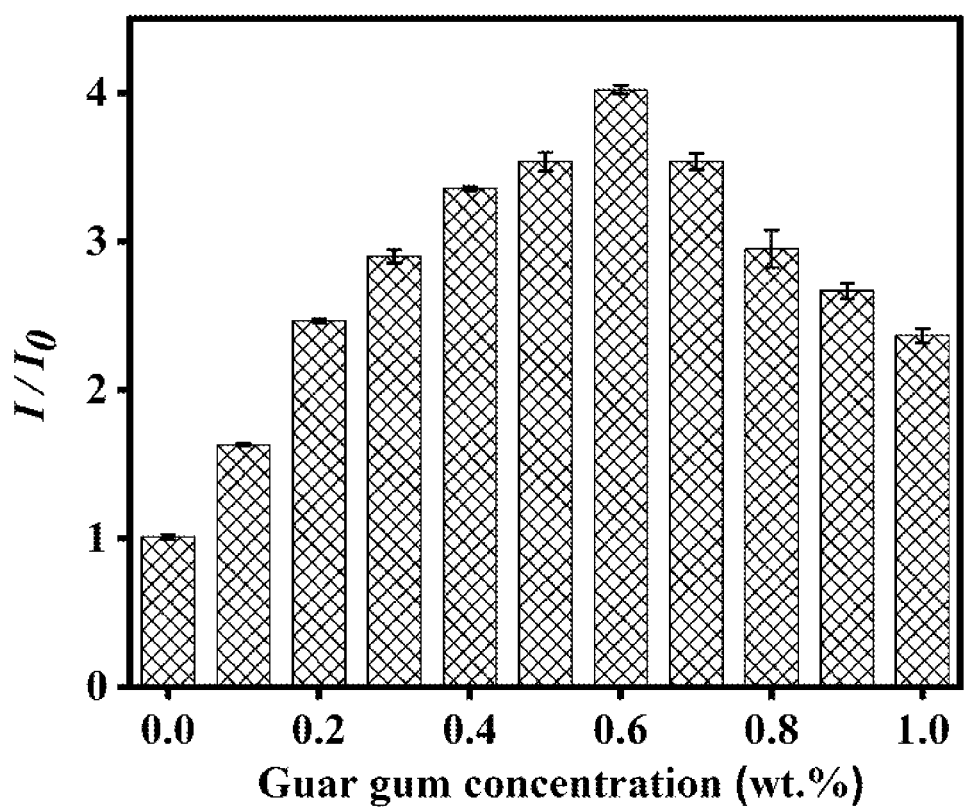
FIG. 2 shows an effect of different concentrations of guar gum dispersions on a fluorescence emission intensity of the gold nanocluster in Example 2.

FIG. 2 shows an effect of different concentrations of guar gum dispersions on the fluorescence emission intensity of gold nanocluster; where h is the fluorescence emission intensity of the gold nanocluster dispersion at 610 nm, and $I_0$ is the fluorescence emission intensity of the guar gum-gold nanocluster mixed dispersion at 610 nm. The results show that the fluorescence emission intensity of gold nanocluster can be enhanced when the concentration of guar gum dispersion is in the range of 0.1 wt. % to 0.6 wt. %. An optimal fluorescence enhancement effect comes from the guar gum dispersion with a concentration of 0.6 wt. %; at this time, the fluorescence emission intensity of gold nanoclusters is increased by nearly 4 times, and the fluorescence quantum yield is increased from 0.96% to 2%. When the guar gum concentration is further increased, the fluorescence enhancement effect of guar gum on the gold nanoclusters is slightly weakened.

Figure 3:
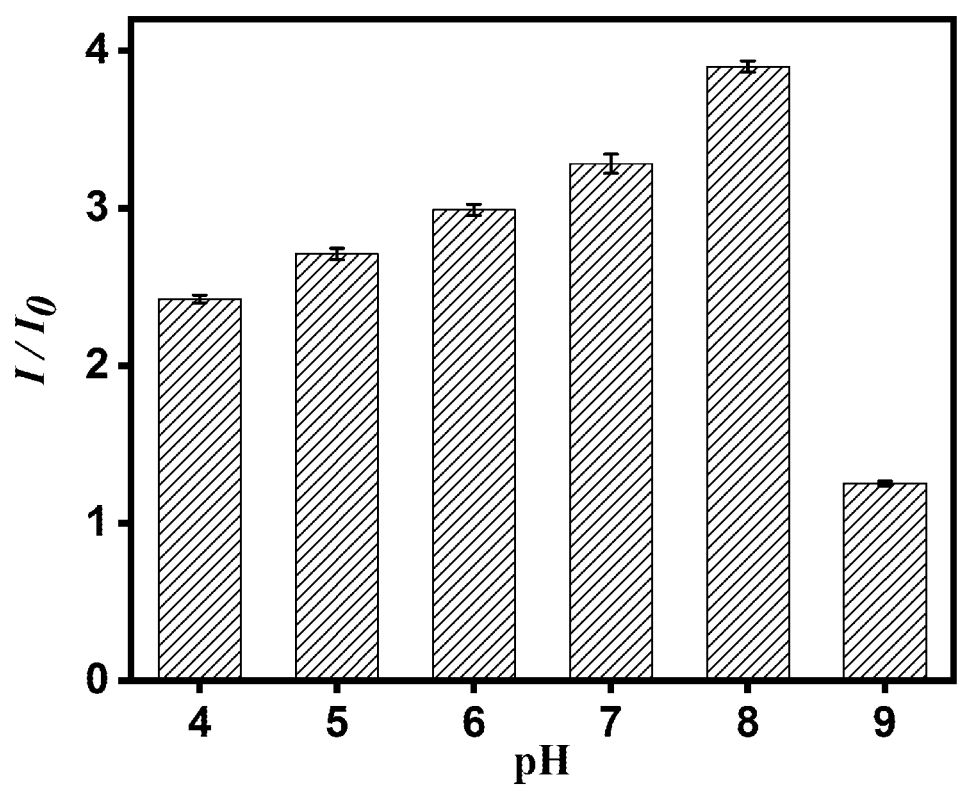
FIG. 3 shows an effect of different pH values of guar gum dispersions on a fluorescence emission intensity of the gold nanocluster in Example 2.

FIG. 3 shows an effect of different pH of guar gum dispersions on the fluorescence emission intensity of gold nanocluster; where $I_0$ is the fluorescence emission intensity of the gold nanocluster dispersion at 610 nm, and I is the fluorescence emission intensity of the guar gum-gold nanocluster mixed dispersion at 610 nm. The results show that when the pH value of guar gum dispersion is 4.0 to 9.0, the guar gum can increase the fluorescence emission intensity of gold nanocluster, and the guar gum dispersion has an optimal pH value of 8.0.

In summary, a preparation method of the fluorescence-enhanced gold nanocluster dispersion includes preferably: 50 μL of the gold nanocluster dispersion and 500 μL of the guar gum dispersion (pH=8.0, concentration of 0.6 wt. %) were mixed, and allowed to stand at room temperature for 10 min to obtain the fluorescence-enhanced gold nanocluster dispersion.

Example 3 Preparation of Fluorescence-Enhanced Gold Nanocluster-$Fe^{3+}$ Mixed Dispersion 550 μL of the fluorescence-enhanced gold nanocluster dispersion prepared in Example 2 was added with 10 μL of $Fe^{3+}$ solutions of different concentrations (the solute was $FeCl_3 \cdot H_2O$, the solvent was 0.1 mol/L hydrochloric acid), and incubated at room temperature for 10 min to obtain guar gum-gold nanocluster-$Fe^{3+}$ mixed dispersions; where in the guar gum-gold nanocluster-$Fe^{3+}$ mixed dispersions, $Fe^{3+}$ concentrations were 0.361 μmol/L, 1.1 μmol/L, 1.6 μmol/L, 3.6 µmol/L, 10 µmol/L, 14 µmol/L, 18 µmol/L, 36 µmol/L, 54 µmol/L, 72 µmol/L, and 90 µmol/L, respectively.

Figure 4:
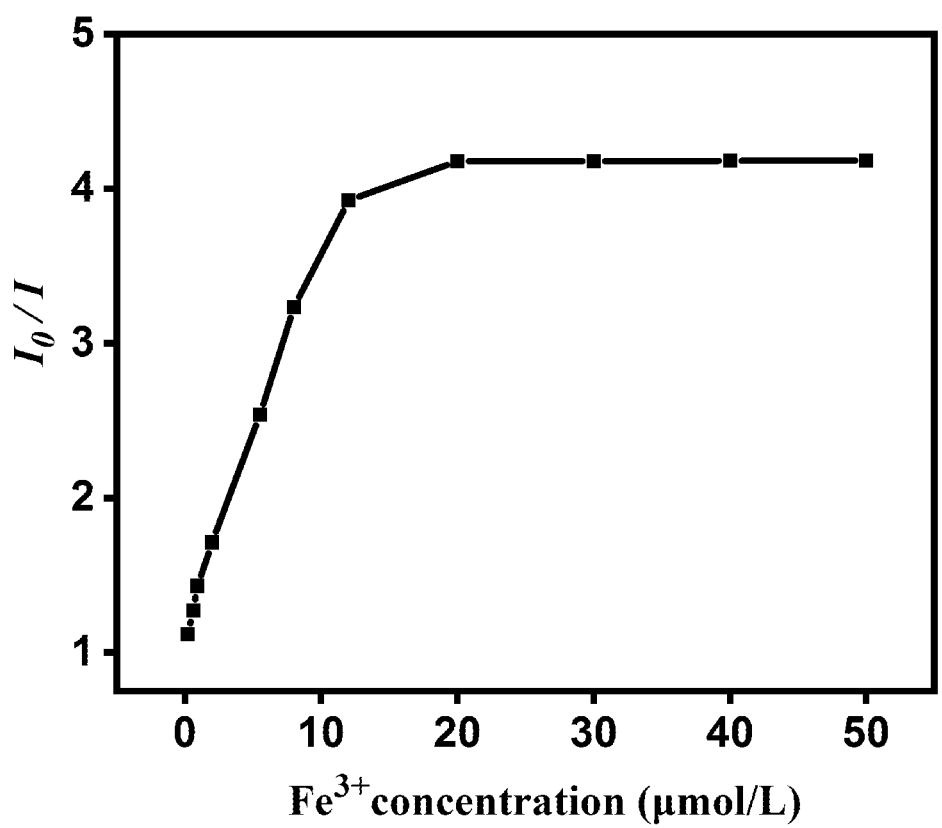
FIG. 4 shows an effect of different concentrations of $Fe^{3+}$ on a fluorescence emission intensity of the guar gum-gold nanocluster mixed dispersion in Example 3.

Fluorescence quenching of the gold nanocluster was caused by dynamic quenching of $Fe^{3+}$. FIG. 4 shows an effect of the different concentrations of $Fe^{3+}$ on the fluorescence emission intensity of the guar gum-gold nanocluster mixed dispersions; where $I_0$ is the fluorescence emission intensity of guar gum-gold nanoclusters mixed dispersion at 610 nm, and I is the fluorescence emission intensity of guar gum-gold nanoclusters-$Fe^{3+}$ mixed dispersion at 610 nm. It can be seen from FIG. 4 that the emission intensity of the guar gum-gold nanocluster mixed dispersion decreases gradually with the increase of $Fe^{3+}$ concentration, and reaches a plateau when the $Fe^{3+}$ concentration is 18 µmol/L.

In summary, a preparation method of the fluorescence-enhanced gold nanocluster-$Fe^{3+}$ mixed dispersion preferably included: 50 µL of the gold nanocluster dispersion was mixed with 500 µL of the guar gum dispersion (pH=8.0, concentration of 0.6 wt. %), and allowed to stand for 10 min at room temperature; an obtained fluorescence-enhanced gold nanocluster dispersion was added with 10 µL of the $Fe^{3+}$ solution with a concentration of 1 mmol/L (the solute was FeCl3 6H$_2$O, and the solvent was hydrochloric acid with a concentration of 0.1 mol/L), and incubated at room temperature for 10 min to obtain the fluorescence-enhanced gold nanocluster-$Fe^{3+}$ mixed dispersion.

Example 4 Detection Method of α-Glu Activity

100 µL of different concentrations of the α-Glu aqueous solutions, 150 µL of the AAG (10 mmol/L) aqueous solution, and 200 µL of the PBS (0.1 mol/L, pH=7.0) were mixed, and allowed to stand at 37° C. for 40 min to conduct first incubation; an obtained first incubation solution was mixed with 560 µL of the fluorescence-enhanced gold nanocluster-$Fe^{3+}$ mixed dispersion prepared in Example 3 (namely, the guar gum-gold nanocluster-$Fe^{3+}$ mixed dispersion), and allowed to stand for 10 min at room temperature to conduct second incubation; a fluorescence emission spectrum of an obtained guar gum-gold nanocluster-$Fe^{3+}$-α-Glu mixed dispersion (namely, the second incubation solution) was measured, and a fluorescence emission intensity was recorded at 610 nm; where in the guar gum-gold nanocluster-$Fe^{3+}$-α-Glu mixed dispersion, the α-Glu had concentrations of $2\times10^{-4}$ U/mL, $2\times10^{-3}$ U/mL, 0.1 U/mL, 0.25 U/mL, 1 U/mL, 2 U/mL, 3 U/mL, 4 U/mL, and 5 U/mL, respectively.

Meanwhile, a blank sample was prepared, specifically as follows: 250 µL of water was mixed with 200 µL of the PBS (0.1 mol/L, pH=7.0), and allowed to stand at 37° C. for 40 min; an obtained solution was mixed with 560 µL of the fluorescence-enhanced gold nanocluster-$Fe^{3+}$ mixed dispersion prepared in Example 3, and allowed to stand for 10 min at room temperature to obtain the blank sample.

Figure 5:
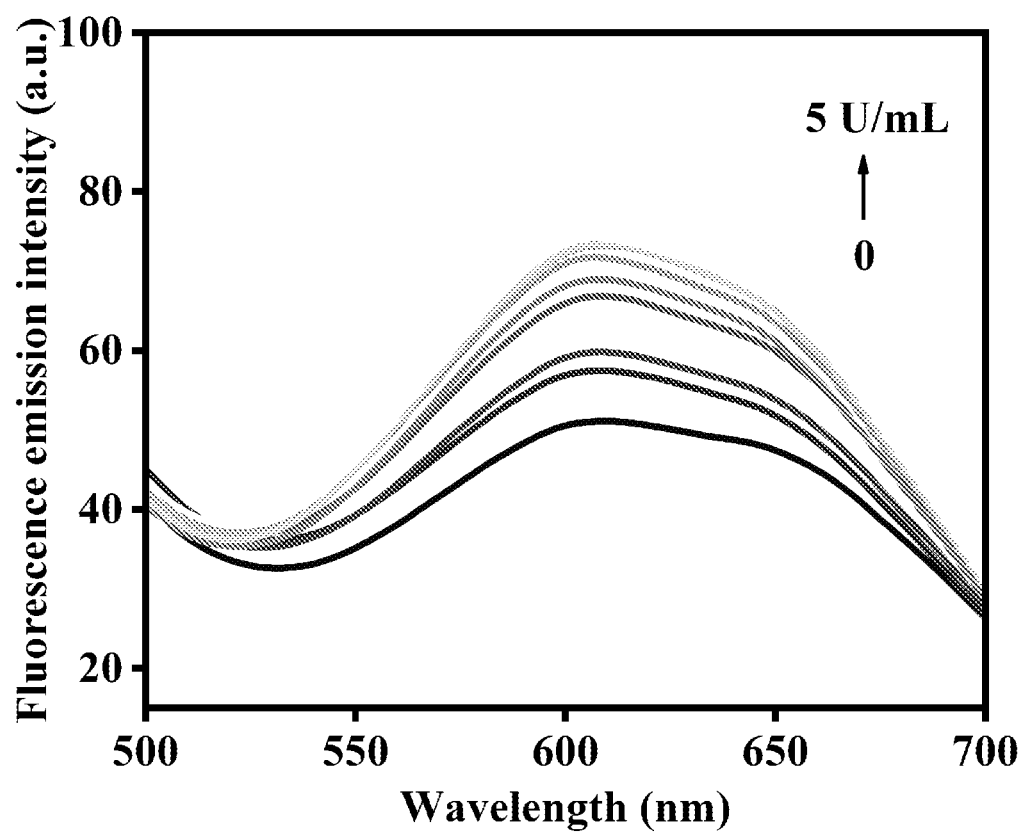
FIG. 5 shows fluorescence spectra of guar gum-gold nanocluster-Fe3+-α-Glu mixed dispersions in Example 4.
Figure 6:
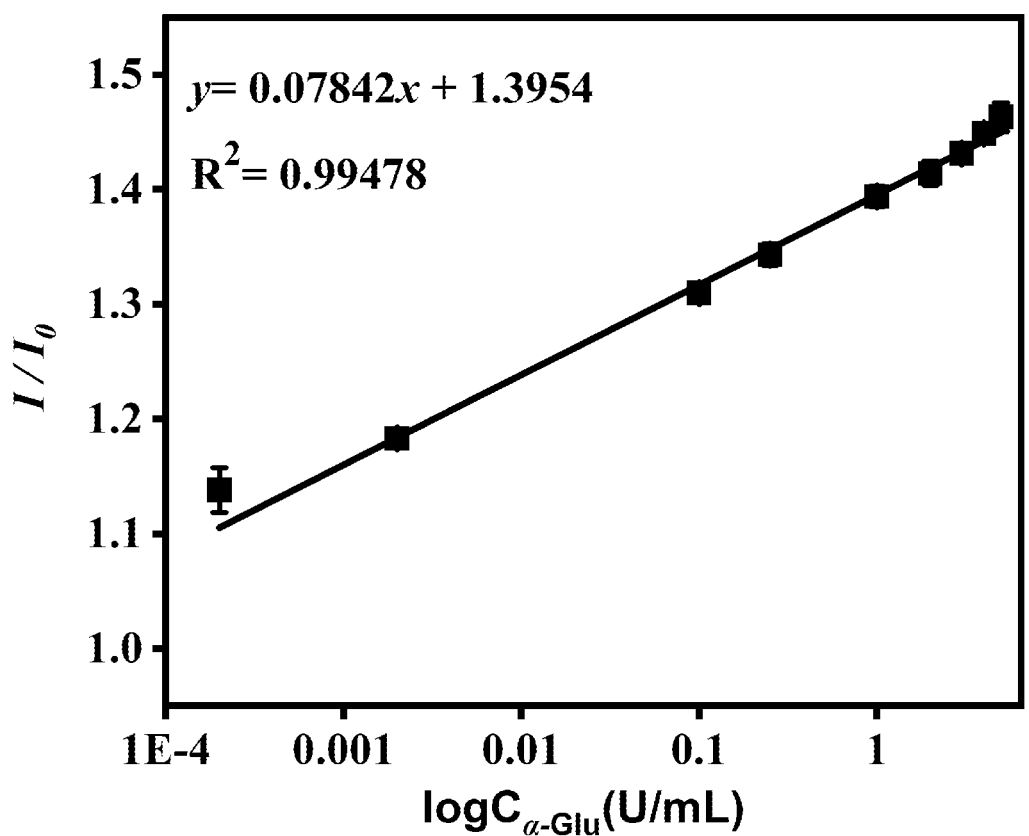
FIG. 6 shows a working curve of detection of an α-Glu activity in Example 4.

In the presence of α-Glu and its substrate AAG, the α-Glu catalyzes the hydrolysis of AAG to generate ascorbic acid, thereby partially restoring the fluorescence emission of gold nanocluster quenched by $Fe^{3+}$; therefore, the α-Glu activity can be detected based on fluorescence methods. FIG. 5 shows fluorescence spectra of guar gum-gold nanocluster-Fe3+-α-Glu mixed dispersions; and FIG. 6 shows a working curve for detecting the α-Glu activity (where $I_0$ is a fluorescence emission intensity of the blank sample at 610 nm, and I is a fluorescence emission intensity of the guar gum-gold nanocluster-$Fe^{3+}$-α-Glu mixed dispersion at 610 nm). It can be seen from FIG. 6 that the fluorescence emission intensity of the guar gum-gold nanocluster-$Fe^{3+}$-α-Glu mixed dispersion increases with an increase of the α-Glu activity; and the α-Glu activity has a detection range of 2 U/L to 4,000 U/L and a detection limit of 0.13 U/L. A classical method for detecting the α-Glu activity is a p-nitrophenol glucopyranoside colorimetric method, with a detection limit of 2.5 U/L to 50 U/L and a linear range of 1 U/L. Compared with the classical method, the method provided by the present disclosure has a wider detection range and lower detection limit, and avoids the modification of fluorescent probes and the use of a large number of organic reagents.

Example 5 Selectivity Verification of Detection Method of α-Glu Activity

To verify the selectivity of the detection method of α-Glu activity, in this example, an influence of various interfering substances that may exist in a biological sample on the detection system was tested. The interfering substances included amino acids (such as alanine (Ala), arginine (Arg), glycine (Gly), histidine (His), lysine (Lys), serine (Ser), and cysteine (Cys)), cations (such as $Na^+$, $K^+$, $Ca^{2+}$, and $Fe^{2+}$), anions (such as $Cl^-$, $NO^{3-}$, $SO_4^{2-}$, and $PO_4^{3-}$), proteins (such as bovine serum albumin (BSA), human serum albumin (HSA), acid phosphatase (ACP), and papain (Pap)), glucose (Glu), fructose (Fru), sucrose (Suc), and cholesterol (Chol).

450 µL of the first incubation solution prepared in Example 4 was mixed with 560 µL of the fluorescence-enhanced gold nanocluster-$Fe^{3+}$ mixed dispersion prepared in Example 3, and 10 µL of aqueous dispersions of the above various interfering substances were added, concentrations of the various interfering substances in obtained mixed solutions each were 10 mmol/L; the mixed solution was incubated at room temperature for 10 min, a fluorescence spectrum of an obtained incubation solution was measured, and fluorescence emission intensity was recorded at 610 nm.

Meanwhile, a blank sample was prepared, specifically as follows: 450 µL of the first incubation solution prepared in Example 4 was mixed with 560 µL of the fluorescence-enhanced gold nanocluster-$Fe^{3+}$ mixed dispersion prepared in Example 3, 10 µL of water was added, and allowed to stand for 10 min at room temperature to obtain the blank sample.

Figure 7:
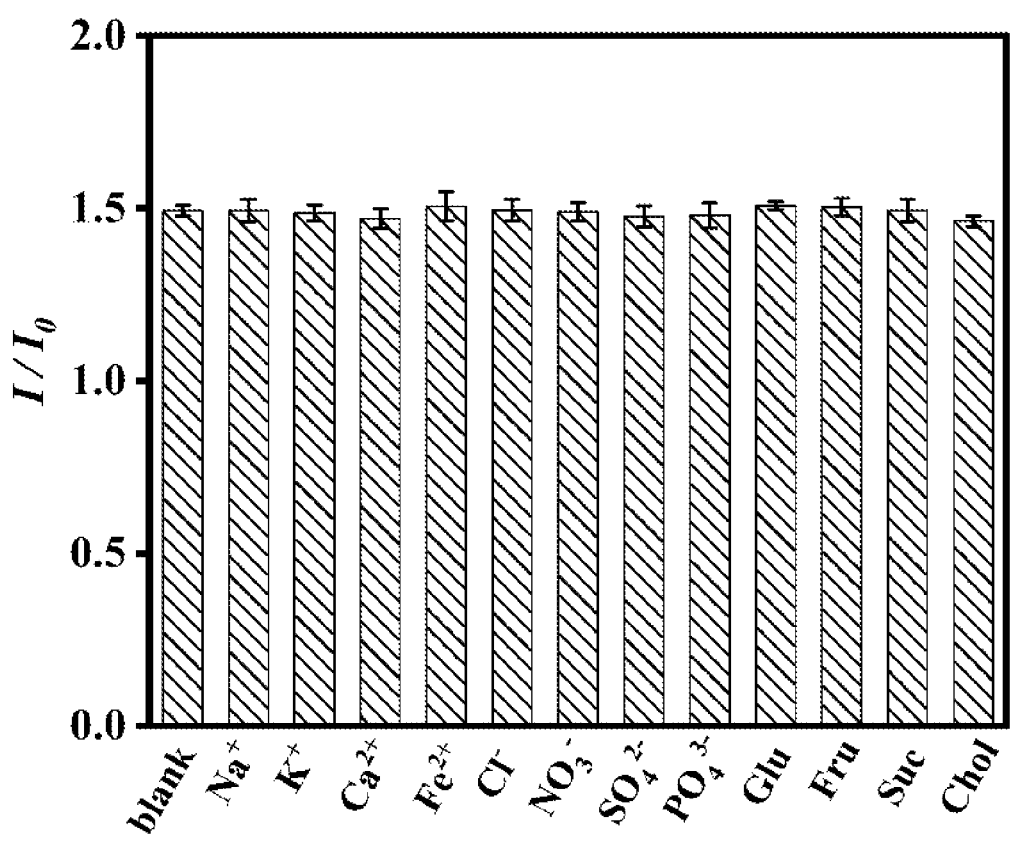
FIG. 7 shows an effect of different interfering substances (cations, anions, glucose, fructose, sucrose, and cholesterol) on the guar gum-gold nanoclusters-$Fe^{3+}$-α-Glu mixed dispersion in Example 5.
Figure 8:
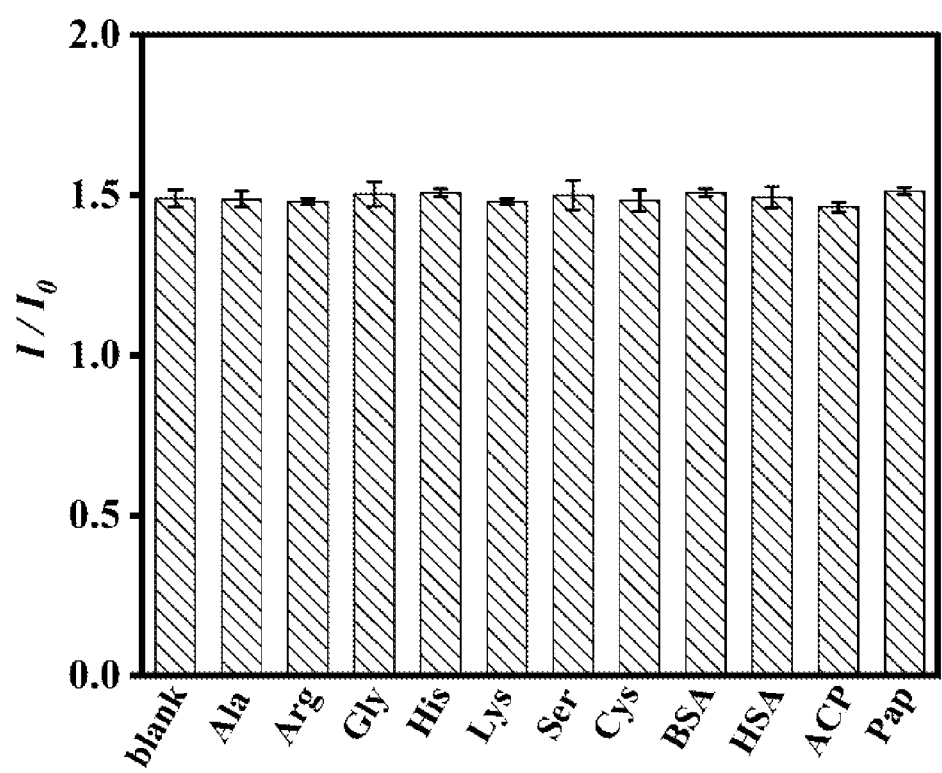
FIG. 8 shows an effect of different interfering substances (amino acids and proteins) on the guar gum-gold nanoclusters-$Fe^{3+}$-α-Glu mixed dispersion in Example 5.

FIG. 7 and FIG. 8 show fluorescence intensities of guar gum-gold nanoclusters-$Fe^{3+}$-α-Glu mixed dispersions at 610 nm in the blank sample and in the presence of different interfering substances. It can be seen from the figure that each interfering substance does not have obvious interferences to the fluorescence detection of α-Glu by the fluorescence-enhanced gold nanocluster of the present disclosure, indicating that the method of the present disclosure has an excellent selectivity.

Example 6 Screening of α-Glu Inhibitor

Acarbose is a common α-Glu inhibitor and one of the few oral drugs that can be used in the treatment of type II diabetes. In this example, the acarbose was used as an example to study a method of the present disclosure in screening an α-Glu inhibitor, and the method included:

100 µL of the α-Glu aqueous solutions, 150 µL of the AAG (10 mmol/L) aqueous solution, and 200 µL of the PBS (0.1 mol/L, pH=7.0) were mixed with 20 µL of various concentrations of α-Glu inhibitors (acarbose), and allowed to stand at 37° C. for 40 min to conduct third incubation; an obtained third incubation solution was mixed with 560 µL of the fluorescence-enhanced gold nanocluster-$Fe^{3+}$ mixed dispersion prepared in Example 3 (namely, the guar gum-gold nanocluster-$Fe^{3+}$ mixed dispersion), and allowed to stand for 10 min at room temperature to conduct fourth incubation; a fluorescence spectrum of an obtained guar gum-gold nanocluster-$Fe^{3+}$-α-Glu-acarbose mixed dispersion (namely, the fourth incubation solution) was measured, and a fluorescence emission intensity was recorded at 610 nm; where in the guar gum-gold nanocluster-$Fe^{3+}$-α-Glu-acarbose mixed dispersion, the acarbose had concentrations of 20 μmol/L, 50 μmol/L, 80 μmol/L, 120 μmol/L, 180 μmol/L, and 200 μmol/L, respectively.

According to the fluorescence emission intensity of the fourth incubation solution under different concentrations of acarbose, an inhibitory efficiency of acarbose was calculated according to formula B:

$$\text{Inhibitory efficiency} = [I_{AuNCs+\alpha\text{-}Glu} - I_{AuNCs+\alpha\text{-}Glu+acarbose}]/[I_{AuNCs+\alpha\text{-}Glu} - I_{AuNCs}], \quad \text{Formula B};$$

where $I_{AuNCs+\alpha\text{-}Glu}$ represents a fluorescence emission intensity of the guar gum-gold nanoclusters-$Fe^{3+}$+α-Glu mixed dispersion;

$I_{AuNCs+\alpha\text{-}Glu+acarbose}$ represents a fluorescence emission intensity of the fourth incubation solution; and $I_{AuNCs}$ represents a fluorescence emission intensity of the guar gum-gold nanoclusters-$Fe^{3+}$ mixed dispersion.

Figure 9:
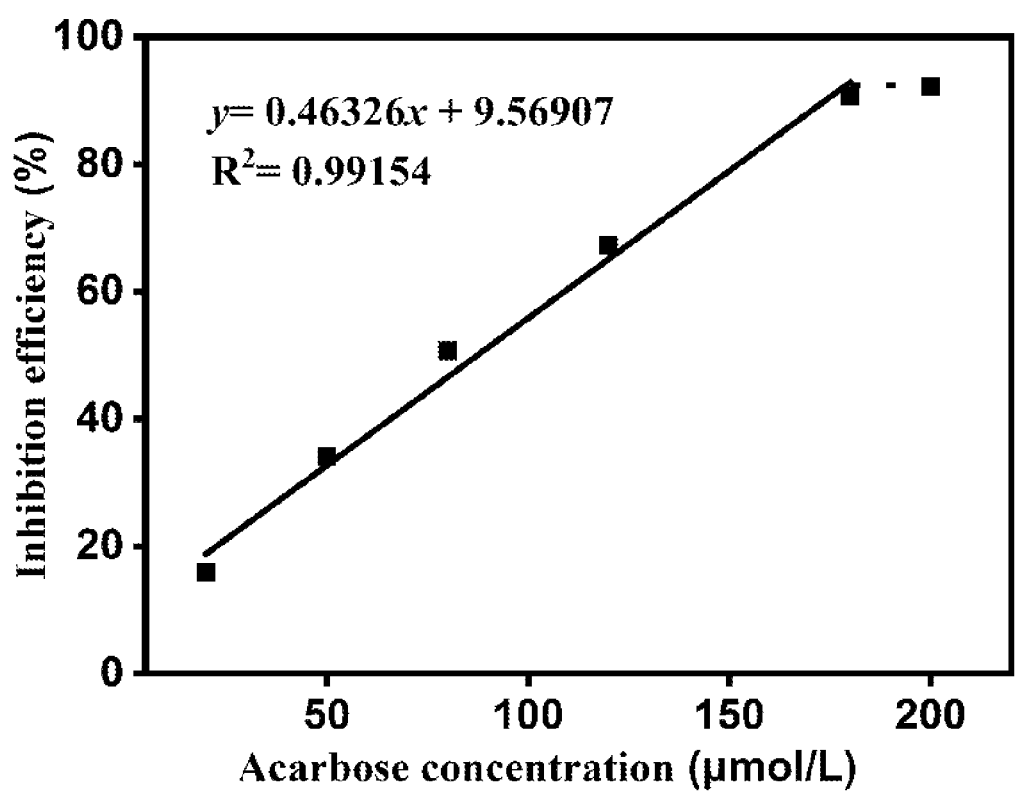
FIG. 9 shows a calibration curve for screening an α-Glu inhibitor (acarbose) in Example 6.

FIG. 9 shows a calibration curve for screening the α-Glu inhibitor (acarbose). As shown in the figure, acarbose can inhibit the α-Glu activity, and with an increase of the acarbose concentration, the fluorescence emission intensity of system gradually decreases.

As can be seen from FIG. 9, the $IC_{50}$ (a concentration of the inhibitor to be tested required to inhibit 50% α-Glu activity) of acarbose is 87.3 μmol/L, which is consistent with an existing literature (Li, C.; et al. *Anal. Bioanal. Chem.* 2021, 413 (9): 2553-2563). This shows that the method provided by the present disclosure can be effectively used for the screening of acarbose.

Example 7 Screening of Plant Extract-Derived α-Glu Inhibitor

Quercetin, rutin and hesperidin (commercially available) are plant extract-derived α-Glu inhibitors. A method provided by the present disclosure can be used for screening the α-Glu inhibitors in plant extracts. In this example, the quercetin was used as an example, and use of the method in screening a plant extract-derived α-Glu inhibitor is studied, and the method included:

100 μL of the α-Glu aqueous solutions, 150 μL of the AAG (10 mmol/L) aqueous solution, and 200 μL of the PBS (0.1 mol/L, pH=7.0) were mixed with 20 μL of various concentrations of α-Glu inhibitors (quercetin), and allowed to stand at 37° C. for 40 min to conduct third incubation; an obtained third incubation solution was mixed with 560 μL of the fluorescence-enhanced gold nanocluster-$Fe^{3+}$ mixed dispersion prepared in Example 3 (namely, the guar gum-gold nanocluster-$Fe^{3+}$ mixed dispersion), and allowed to stand for 10 min at room temperature to conduct fourth incubation; a fluorescence spectrum of an obtained guar gum-gold nanocluster-$Fe^{3+}$-α-Glu-quercetin mixed dispersion (namely, the fourth incubation solution) was measured, and a fluorescence emission intensity was recorded at 610 nm; where in the guar gum-gold nanocluster-$Fe^{3+}$-α-Glu-quercetin mixed dispersion, the quercetin had concentrations of 6 μmol/L, 8 μmol/L, 10 μmol/L, 15 μmol/L, 20 μmol/L, 30 μmol/L, 40 μmol/L, 50 μmol/L, 60 μmol/L, and 70 μmol/L, respectively.

According to the fluorescence emission intensity of the fourth incubation solution under different concentrations of quercetin, an inhibitory efficiency of quercetin was calculated according to formula C:

$$\text{Inhibitory efficiency} = [I_{AuNCs+\alpha\text{-}Glu} - I_{AuNCs+\alpha\text{-}Glu+quercetin}]/[I_{AuNCs+\alpha\text{-}Glu} - I_{AuNCs}], \quad \text{Formula C};$$

where $I_{AuNCs+\alpha\text{-}Glu}$ represents a fluorescence emission intensity of the guar gum-gold nanoclusters-$Fe^{3+}$-α-Glu mixed dispersion;

$I_{AuNCs+\alpha\text{-}Glu+quercetin}$ represents a fluorescence emission intensity of the fourth incubation solution; and $I_{AuNCs}$ represents a fluorescence emission intensity of the guar gum-gold nanoclusters-$Fe^{3+}$ mixed dispersion.

Figure 10:
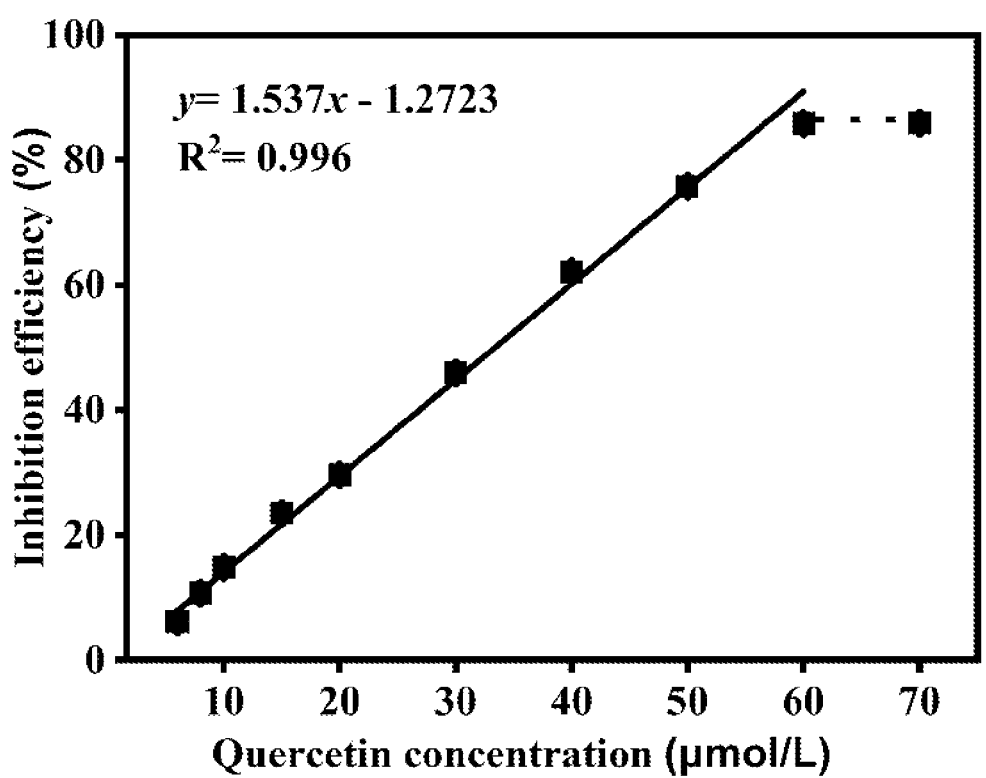
FIG. 10 shows a calibration curve for screening an α-Glu inhibitor (quercetin) in Example 7.

FIG. 10 shows a calibration curve for screening the α-Glu inhibitor (quercetin). As shown in the figure, quercetin can inhibit the α-Glu activity, and with an increase of the quercetin concentration, the fluorescence emission intensity of system gradually decreases.

It can be seen from FIG. 10 that the $IC_{50}$ of quercetin is 33.4 μmol/L, which is consistent with an existing literature (Liu, D.; et al. 2020. Colloids Surf., B). This shows that the method provided by the present disclosure can be effectively used for the screening of quercetin.

Figure 11:
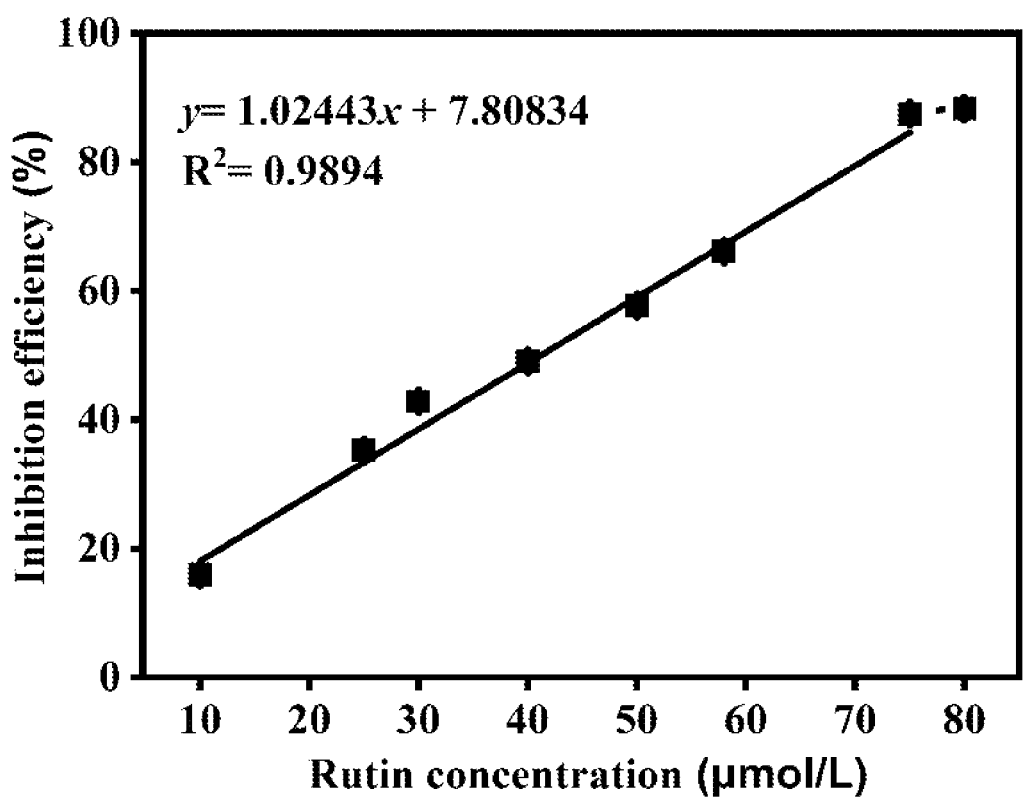
FIG. 11 shows a calibration curve for screening an α-Glu inhibitor (rutin) in Example 7.
Figure 12:
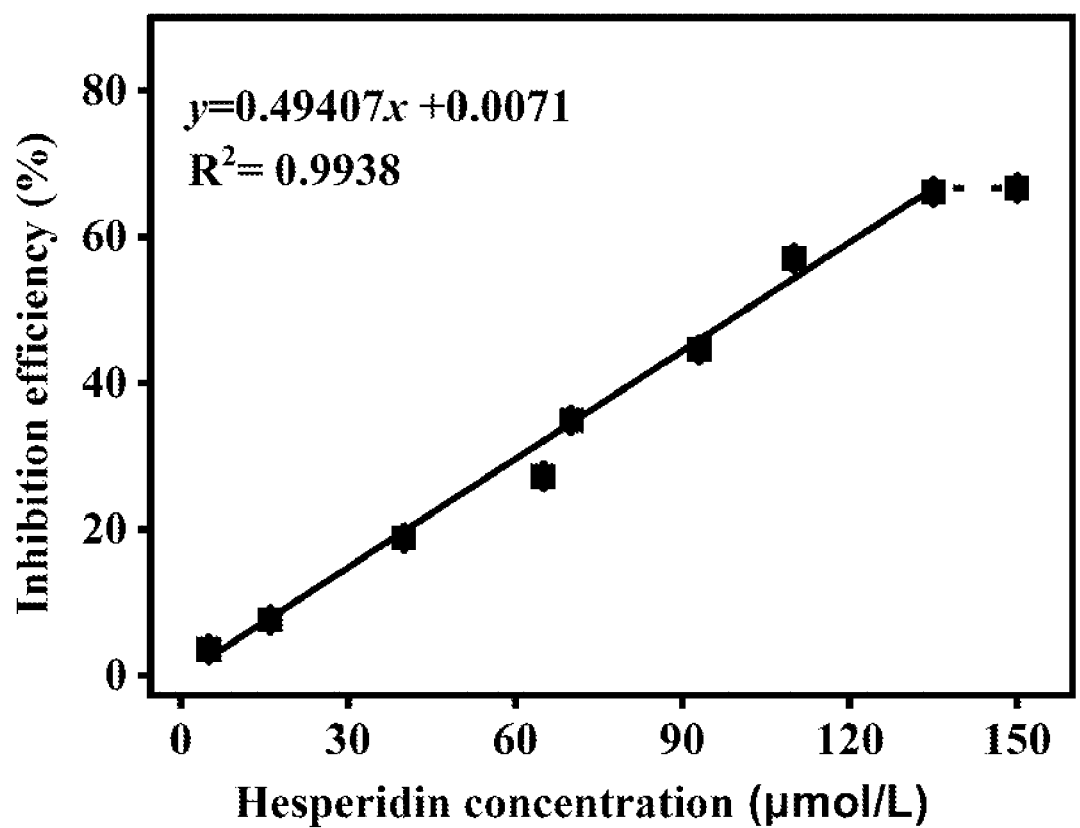
FIG. 12 shows a calibration curve for screening an α-Glu inhibitor (hesperidin) in Example 7.

According to the above method, inhibitory efficiencies of rutin and hesperidin were calculated and calibration curves were drawn, as shown in FIG. 11 and FIG. 12. According to FIG. 11 and FIG. 12, the $IC_{50}$ of the rutin and the hesperidin are 56.43 μmol/L and 101.2 μmol/L, respectively. These results are in desirable agreement with literature reports (Liu, D.; et al. 2020. Colloids Surf, B), further demonstrating the reliability of the method in the present disclosure.

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. A method for detecting an α-glucosidase (α-Glu) activity, comprising the following steps:

providing a fluorescence-enhanced gold nanocluster-$Fe^{3+}$ mixed dispersion, wherein the fluorescence-enhanced gold nanocluster-$Fe^{3+}$ mixed dispersion comprises a fluorescence-enhanced gold nanocluster prepared from gold nanoclusters, guar gum, and water as raw materials;

mixing an α-Glu solution to be tested, an L-ascorbic acid-2-O-α-D-glucopyranoside (AAG) solution, and a phosphate-buffered saline (PBS), and conducting first incubation to obtain a first incubation solution;

mixing the first incubation solution with the fluorescence-enhanced gold nanocluster-$Fe^{3+}$ mixed dispersion, and conducting second incubation to obtain a second incubation solution; and subjecting the second incubation solution to fluorescence detection, and obtaining an activity of the α-Glu to be tested according to a working curve of the α-Glu activity and a fluorescence emission intensity obtained by the fluorescence detection, wherein the fluorescence detection is conducted at a wavelength of 610 nm.

2. The method according to claim 1, wherein the fluorescence-enhanced gold nanocluster-$Fe^{3+}$ mixed dispersion has a pH value of 4.0 to 9.0, and comprises 10 μg/mL to 90 μg/mL of the gold nanocluster, 0.05 wt. % to 1.0 wt. % of the guar gum, and 0.1 μmol/L to 100 μmol/L of $Fe^{3+}$.

3. The method according to claim 1, wherein the first incubation is conducted at 30° C. to 50° C. and a pH value of 6.0 to 8.0 for 40 min to 60 min, with 1 mmol/L to 20 mmol/L of AAG.

4. The method according to claim 1, wherein the second incubation is conducted at 20° C. to 30° C. for 10 min to 60 min; and the first incubation solution and the fluorescence-enhanced gold nanocluster-$Fe^{3+}$ mixed dispersion have a volume ratio of 1:(1-10).

5. The method according to claim 2, wherein the second incubation is conducted at 20° C. to 30° C. for 10 min to 60 min; and the first incubation solution and the fluorescence-enhanced gold nanocluster-$Fe^{3+}$ mixed dispersion have a volume ratio of 1:(1-10).

6. The method according to claim 3, wherein the second incubation is conducted at 20° C. to 30° C. for 10 min to 60 min; and the first incubation solution and the fluorescence-enhanced gold nanocluster-$Fe^{3+}$ mixed dispersion have a volume ratio of 1:(1-10).

7. A method for screening an α-Glu inhibitor, comprising the following steps:
provia fluorescence-enhanced gold nanocluster-$Fe^{3+}$ mixed dispersion, wherein a fluorescence-enhanced gold nanocluster in the fluorescence-enhanced gold nanocluster-$Fe^{3+}$ mixed dispersion is the fluorescence-enhanced gold nanocluster according to claim 3;
mixing an α-Glu inhibitor solution to be tested, an α-Glu solution, an AAG solution, and a PBS, and conducting third incubation to obtain a third incubation solution;
mixing the third incubation solution with the fluorescence-enhanced gold nanocluster-$Fe^{3+}$ mixed dispersion, and conducting fourth incubation to obtain a fourth incubation solution; and
subjecting the fourth incubation solution to fluorescence detection, and plotting a calibration curve of the α-Glu inhibitor to be tested according to a fluorescence emission intensity obtained by the fluorescence detection;
according to the calibration curve of the α-Glu inhibitor to be tested, obtaining a half-maximal inhibitory concentration ($IC_{50}$) of the α-Glu inhibitor to be tested to screen the α-Glu inhibitor.

8. The method according to claim 7, wherein the α-Glu inhibitor to be tested is selected from the group consisting of acarbose and a plant extract-derived α-Glu inhibitor.

* * * * *